(12) United States Patent
Moncrieff

(10) Patent No.: US 7,403,309 B2
(45) Date of Patent: Jul. 22, 2008

(54) METHOD FOR PRODUCING PRINTED IMAGE HAVING 3-DIMENSIONAL APPEARANCE

(76) Inventor: Scott E. Moncrieff, 6102 Camino De La Costa, La Jolla, CA (US) 92037

( * ) Notice: Subject to any disclaimer, the term of this patent is extended or adjusted under 35 U.S.C. 154(b) by 873 days.

(21) Appl. No.: 10/914,940

(22) Filed: Aug. 9, 2004

(65) Prior Publication Data
US 2005/0219626 A1 Oct. 6, 2005

Related U.S. Application Data

(60) Provisional application No. 60/560,242, filed on Apr. 5, 2004.

(51) Int. Cl.
  *G06K 15/00* (2006.01)
  *H04N 1/405* (2006.01)
  *B41C 1/02* (2006.01)
  *B41C 1/04* (2006.01)
(52) U.S. Cl. .................... 358/3.12; 358/3.31
(58) Field of Classification Search ......... 358/3.12, 358/1.1, 1.2, 1.4, 1.7, 1.8, 1.9, 1.11, 1.12, 358/1.18, 2.1, 3.11, 3.2, 3.31, 3.32, 503; 359/619, 620, 625, 626; 101/491; 427/258, 427/261, 265
See application file for complete search history.

(56) References Cited

U.S. PATENT DOCUMENTS

| | | | |
|---|---|---|---|
| 4,661,743 A * | 4/1987 | Matsuoka et al. | ........... 313/496 |
| 4,839,250 A | 6/1989 | Cowan | |
| 5,882,770 A | 3/1999 | Makansi | |
| 5,968,607 A | 10/1999 | Lovison | |
| 6,017,657 A | 1/2000 | Mentz et al. | |
| 6,042,888 A | 3/2000 | Sismanis et al. | |
| 6,539,856 B2 | 4/2003 | Jones et al. | |
| 6,546,872 B1 * | 4/2003 | Huffer et al. | ............... 101/491 |
| 6,634,289 B2 | 10/2003 | Foster et al. | |

(Continued)

OTHER PUBLICATIONS

PCT International Search Report for PCT/US2005/10964, Applicant: Scott Moncrieff, Forms PCT/ISA/220 and PCT/ISA/210, dated Apr. 29, 2008 (4 pages).

(Continued)

*Primary Examiner*—Douglas Q Tran
(74) *Attorney, Agent, or Firm*—Vista IP Law Group LLP

(57) ABSTRACT

A method for printing images on a substrate wherein the image has a textured, three-dimensional appearance is described. The printing method comprises printing a graphic design consisting of very fine lines having varying width, shape and orientation. This process is effective on the first surface of a pre-metalized substrate and on the second surface of a clear substrate. The lines are printed using an ink which even after drying or curing has a thickness (height above the film) to produce the desired textured effect. A layer of reflective ink is then printed over the entire boundary of the printed substrate, including over the clear ink. A protective layer of pigmented ink may then be printed over the reflective ink to protect the decorative substrate from abrasion. This printing process method may be used to make labels (both flat and formed) for any decorative application. Applications include flat two-dimensional parts using pressure sensitive adhesive and flat or three-dimensional formed applique's for use in In Mold Decoration and In Mold Labeling.

52 Claims, 9 Drawing Sheets

U.S. PATENT DOCUMENTS 6,989,931 B2 * 1/2006 Rosenthal .................. 359/619
2004/0140665 A1 7/2004 Scarbrough et al.
2007/0279454 A1 * 12/2007 Sato et al.

OTHER PUBLICATIONS

PCT Written Opinion for PCT/US2005/10964, Applicant: Scott Moncrieff, Form PCT/ISA/237, dated Apr. 29, 2008 (5 pages).

* cited by examiner

METHOD FOR PRODUCING PRINTED IMAGE HAVING 3-DIMENSIONAL APPEARANCE

RELATED APPLICATIONS

This Application claims the benefit of U.S. provisional Application No. 60/560,242 filed on Apr. 5, 2004. U.S. provisional Application No. 60/560,242 is incorporated by reference as if set forth fully herein.

FIELD OF THE INVENTION

The present invention relates generally to printing techniques and more particularly to printing images simulating engraved, etched or embossed images.

BACKGROUND OF THE INVENTION

There a numerous methods to ornament, decorate and label articles. For example, decoration can be added to an article by molding, printing, painting, applying a decal, embossing, etching, engraving, among others. Printing, painting and decals are effective for creating flat, two-dimensional images, whereas, molding embossing, etching, and engraving can create textured, three-dimensional images.

The textured, three-dimensional images are often desirable because their visual appearance can change depending on the angle at which they are viewed and the angle of incident light. These images are commonly associated with more expensive, luxury articles. Indeed, decorating an article by molding, embossing, etching and engraving is usually much more expensive than decorating by most available printing techniques. Also, it is generally relatively expensive to change the decorative design created by these processes.

Guilloche is a centuries old form of engraving which is used to create the ornamentation on the dials that distinguish some of the most expensive and rare watches. The term guilloche is derived from the French word "Guillochis," used to describe the mechanical creation of precise, regular decorative patterns comprising straight and rounded lines using a technique related to engraving. The engraving is performed by an artisan utilizing a rose engine (named for the shape of its cams). The engine is similar to a lathe but is hand powered. The decorated piece is fixed onto the engine. A cutting tool is held in place as the decorated piece is moved against the cutting tool. With one hand, the artisan cranks the engine to rotate the decorated piece while his other hand regulates the pressure of the tool against the decorated piece. FIG. 1 shows several examples of patterns created by the guilloche process. As one might imagine, decorating by guilloche is a time consuming, expensive process. Engraving a single watch dial can take a guillocheur an entire day, which a brocading machine, a type of pantograph, can produce a similar engraving in forty minutes. In order to produce similar looking dials for mass production quantities, most dials displaying guilloche like patterns are embossed or stamped. But stamped patterns do not reflect light in the same manner as an authentic guilloche engraved pattern.

Another design used to decorate articles which can produce the effect of a three dimensional image is a holographic image. Basically, a hologram is a recording of an interference fringe pattern between two beams of coherent light (typically light produced by a laser). The resulting recording is a series of very finely spaced lines of varying widths that acts as a diffraction pattern. When illuminated with only the reference beam or similar light, the object beam displaying the three-dimensional object image is reproduced in phase and amplitude.

For background, one process for producing a hologram will be explained with reference to FIG. 2. A laser is provided which produces coherent light, meaning light of the same wavelength and which is in phase. The laser light is split into two beams, a reference beam and an object beam, by a beam splitter. The reference beam is expanded by a lens or curved mirror and is aimed directly through an interference region onto a film plate. The film plate comprises a suitable high resolution photosensitive emulsion (e.g. silver halide) which can resolve over one-thousand spaced lines per millimeter (mm). The object beam is also expanded through a lens and is aimed at the three-dimensional object to be imaged. The object beam reflects off of the object and some of the reflected light reflects through the interference region. The reference beam and reflected object beam interact to form an interference pattern which is recorded on the film. One beam comprises light reflected from the object of which the image is being recorded and is called an "object beam."

As described above, the resulting recording comprises a series of very finely spaced lines representing the interference pattern of the reference beam and reflected object beam. For typical wavelengths of visible light, the density of the lines is approximately 2000 lines per millimeter. Due to the very high resolution required, several precise processes have been developed for volume reproduction of the recorded holographic diffraction pattern. In one such process, photoresist is used to produce a metalized surface relief pattern on a master die. The master die is then used to emboss the diffraction pattern into a thermoplastic film which has typically been softened by heat, pressure, solvents or some combination thereof. In the last step, the film is coated with a highly reflective metal, such as aluminum or silver, usually by vacuum deposition. The result is a hologram in which the recorded light pattern is reconstructed in ordinary light reflected off the reflective metal coating and diffracted by the embossed diffraction pattern. The hologram can be attached to an article as decoration or as a product authentication device by lamination or other suitable attachment means. Several processes, including the one described above, for creating and replicating holograms are described in detail in U.S. Pat. Nos. 4,839,250, 5,882,770 and 6,017,657, the disclosures of which are hereby incorporated herein in their entireties.

Screen printing is another example of a useful technique for producing decoration and labeling on film substrates. Screen printing is also a very efficient and cost effective process for high volume, mass production of decorated and/or labeled articles. With its ability to vary and control ink thickness accurately, screen printing is an extremely versatile and useful process for decorating many different types of films which can then be applied to articles as decoration and/or labeling. While screen printing is generally well known to those skilled in the art, a short description will be included herein for completeness. Screen printing begins by creating the graphic design to be reproduced. Today, most designs are generated by computer with the aid of design drafting software, but the design may be created manually or by any other suitable method. The graphic design is then transferred onto a piece of clear film with the image printed in black. The black portions of the printed film prevent light from transmitting through the film. A screen mesh is coated with a light sensitive emulsion. The printed film is then fastened to the screen and exposed to a bright light. The dark areas of the film block the light from exposing the areas of the screen that are to print, and the transparent areas allow a photo-chemical reaction to harden the emulsion. When the screen is rinsed with water or other solvent, the emulsion washes out of the areas that were not exposed. This results in a screen with openings in the areas of the printed image. The screen is clamped into a frame that holds the screen steady during printing. The substrate to be printed is placed under the screen and is held by vacuum, clamps or other means during printing. With the screen lowered over the substrate and held at the correct off contact distance, ink is forced through the screen by the blade of a squeegee. The squeegee may be automated to control the speed, pressure, stroke and angle of the blade across the screen. Once the ink is printed onto the substrate it must be dried or cured depending on the type of ink. If the ink is solvent bases, then it may be dried by a gas or electric dryer. If the ink is curable, for example by exposure to ultraviolet (UV) light, then the printed substrate is exposed to ultraviolet light. Screen printing and processes for producing screens and stencils are described in greater detail in U.S. Pat. Nos. 6,634,289 and 6,539,856, the disclosures of which are hereby incorporated by reference herein in their entireties.

The decorated films created by the holographic and screen printing processes described above may be applied to articles by many different methods. One method for adding decorative designs to thermoplastically molded articles is the in-mold decorating (IMD) process, sometimes referred to as in-mold labeling (IML), full surface decoration (FSD) or film insert molding. In a typical IMD process, the printed film is trimmed to the dimensions of the mold and/or formed into a three-dimensional shape that matches the shape of the mold cavity. The printed film is then placed into a mold and molten thermoplastic resin is injected into the mold behind and/or around the printed substrate. The result is a one-piece, permanently bonded article decorated by the printed film. The IMD process is described in detail in U.S. Pat. Nos. 6,623,677 and 6,117,384, the disclosures of which are hereby incorporated by re entireties.

Various methods of printing graphics on articles to provide a textured or "tactile" look have been previously described. Such methods have been described for use in printing images on articles such as advertising signs, brochures, greeting cards, packaging material, trading cards and the like. For example, U.S. Pat. No. 6,042,888, issued Mar. 28, 2000 to Sismanis et al. describes a print article and method for making the print article which has a design which projects above the surface of a substrate. The substrate is described as being opaque with a reflective, shiny first surface (the first surface is the surface facing the intended viewing side of the substrate and a second surface is the opposite surface). The projecting design is formed by a layer of thick ink printed on the first surface of a substrate. The thick ink layer has sufficient thickness so that the thickness of the ink is visible to an observer and also has a tactile feel for an observer, similar to an embossed effect.

U.S. Pat. No. 5,968,607, issued Oct. 19, 1999 to Lovison, describes a printed article and process similar to Sismanis et al., except that Lovison is directed to a higher throughput continuous roll substrate and process for printing on a continuous roll. Typical ink thicknesses for the printed products and processes disclosed in Sismanis et al. and Lovison are greater than 0.01 inches. Furthermore, the printed lines are widely spaced apart (shown to be at least 0.1 inches or more) so that the individual lines are easily resolved from each other from a typical viewing distance. Indeed, it would be infeasible with the printing processes disclosed in Sismanis et al. and Lovison to print lines that are 0.01 inches or thicker to print very thin lines at very high line densities because such lines would tend to bleed together.

SUMMARY OF THE INVENTION

The printing method of the present invention produces printed images having a textured and/or three-dimensional appearance using aspects of standard printing techniques. The printing method comprises printing a graphic design consisting of a plurality of lines onto a clear substrate. The lines are very fine, have a significant thickness and are very closely spaced together. The lines may have varying width, shape and orientation. For purposes of describing the present invention, the "width" of a line means the distance from one side of the line to the other side of the line from a plan (or top) view of the image; the "thickness" of a line means the height of the line above the printed substrate; and the "space" or "spacing" between lines means the distance from the edge of one line to the edge of an adjacent line. The images of the present invention consist of very fine lines having the following characteristics: a width of between 0.002 to 0.010 inches, and more preferably between 0.003 to 0.007 inches; a thickness of between 5 to 100 microns, more preferably between 10 to 50 microns, and more preferably between 10 to 20 microns; and a spacing of between 0.002 to 0.010 inches, and more preferably between 0.003 to 0.007 inches. The lines are printed using an ink which even after drying or curing has the required thickness to produce the desired textured effect.

A layer of reflective ink is then printed over the entire boundary of the printed substrate, including over the clear ink. A protective layer of pigmented ink may then be printed over the reflective ink to protect the decorative substrate from abrasion.

The printing of the clear ink, reflective ink and protective ink may be performed by any suitable printing method, including without limitation, screen printing (lithography), gravure, offset, reprography, ink jet, laser, flexography, or electronic means, so long as they provide the desired ink thickness and line resolution.

The resulting image produced on the printed substrate has several unique characteristics which are not present in printed images produced by previously disclosed printing techniques. For one, depending on the specific design of the plurality of lines, the image may have a textured, three-dimensional appearance. Moreover, the image may appear to move as the viewing angle of an observer changes or the angle of incident light onto the image changes.

The process of the present invention is effective on the first surface of a pre-metalized substrate and on second surface of a clear substrate. For example, the substrate may have a reflective layer pre-applied or the substrate may be made of a material which is reflective, like aluminum foil. This printing process may be used to make labels (both flat and formed) for any decorative application. Some of these applications include, without limitation, flat two-dimensional parts using pressure sensitive adhesive and flat or three-dimensional formed applique's for use in In Mold Decoration and In Mold Labeling.

DETAILED DESCRIPTION OF THE INVENTION

The present invention provides a method for producing printed images having a textured and/or three-dimensional appearance using aspects of standard printing techniques. The appearance of these printed images simulates and in some cases approaches the appearance created by the more expensive and time-consuming engraving, embossing, stamping and holographic processes described above. But, by utilizing some of the techniques found in known printing processes, the method of the present invention can be used to create similar decorative images on articles at mass production rates and at a fraction of the cost.

Figure 1:
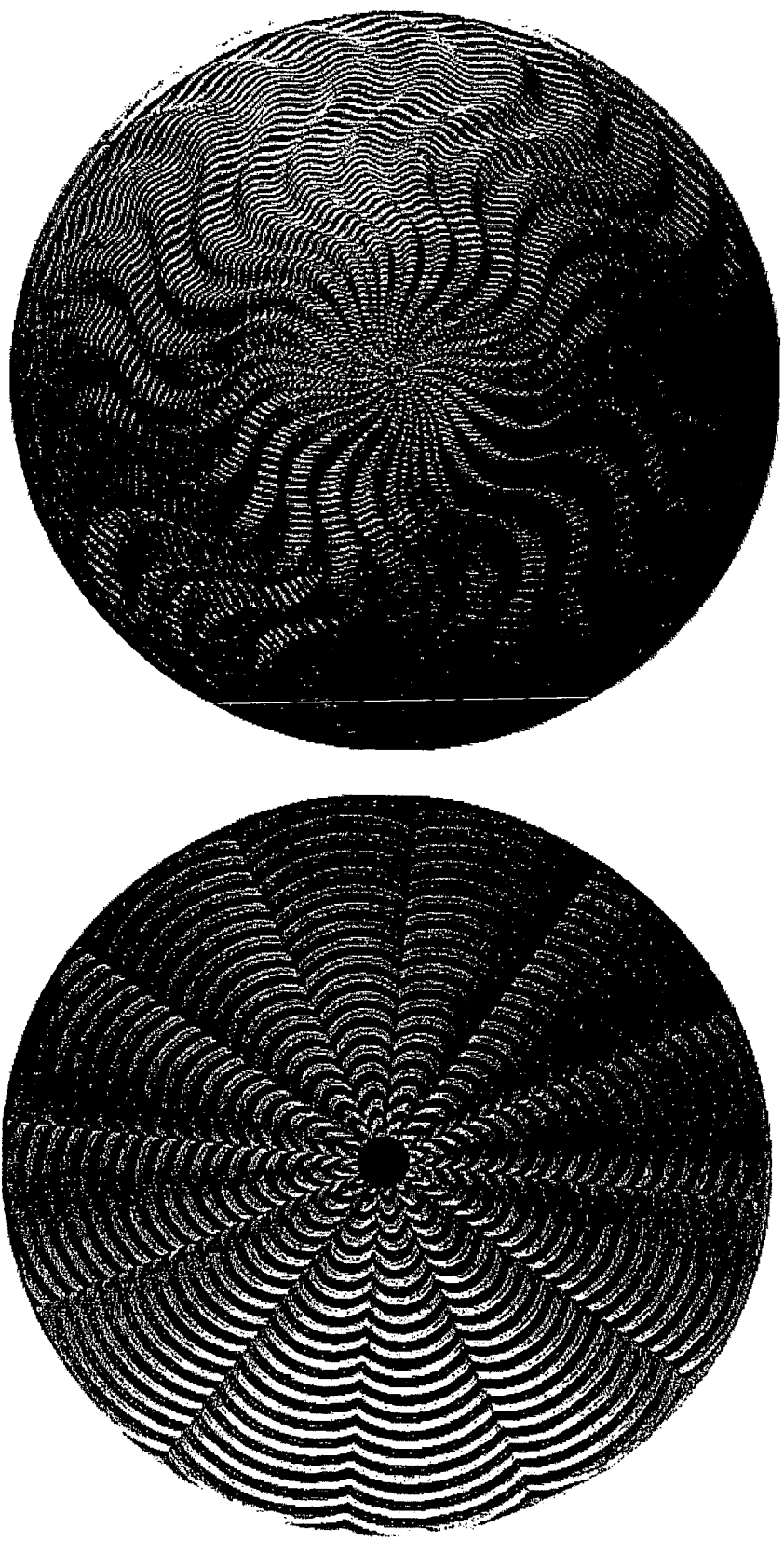
FIG. 1 shows various guilloche patterns used for watch dials.
Figure 2:
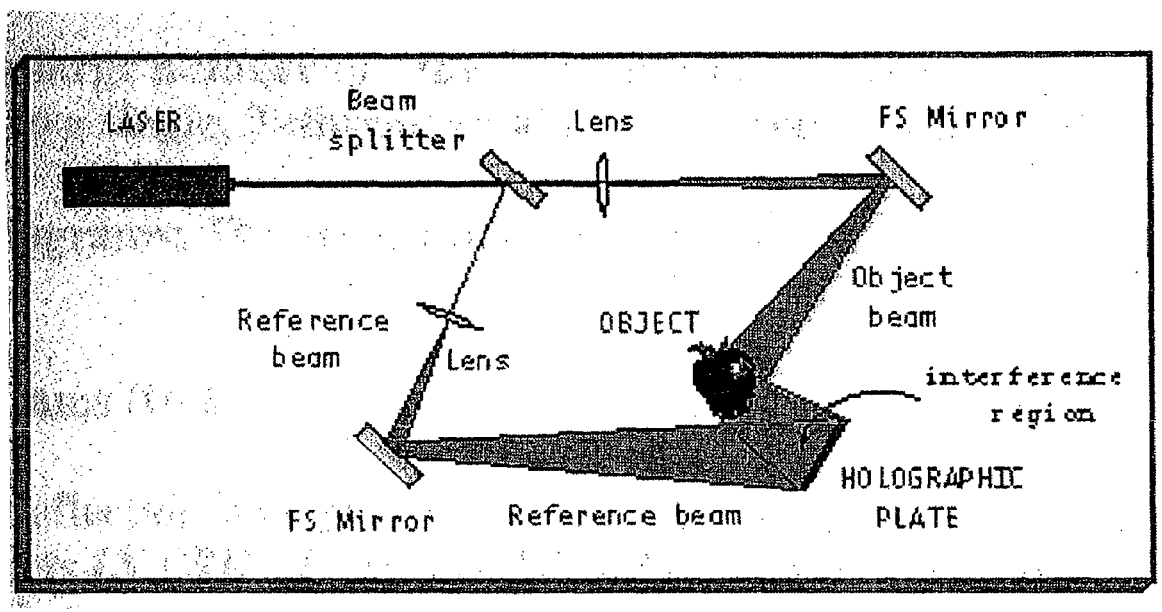
FIG. 2 is a schematic of a system used for producing a holographic image.
Figure 3:
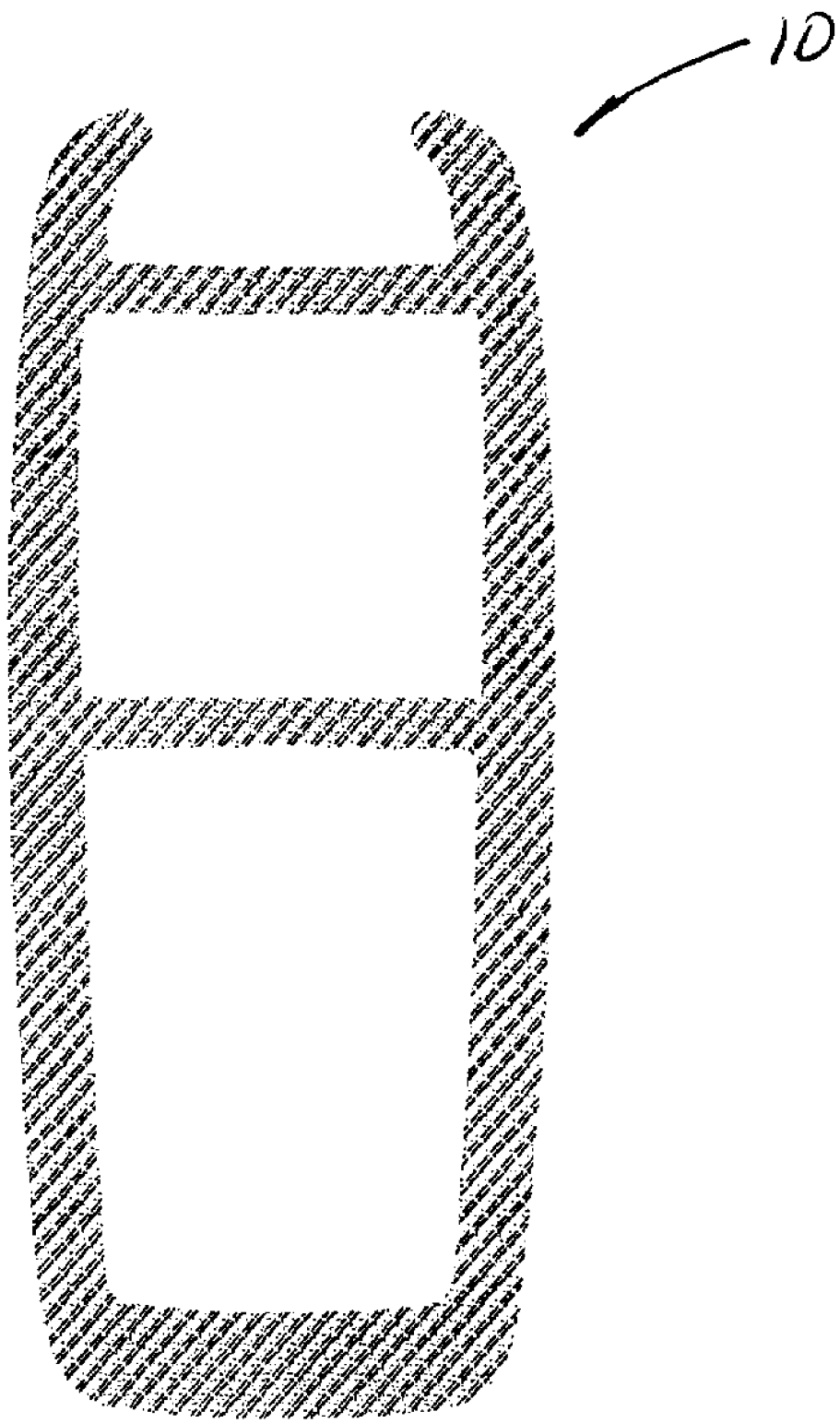
FIG. 3 is an exemplary graphic design according to the present invention.
Figure 4:
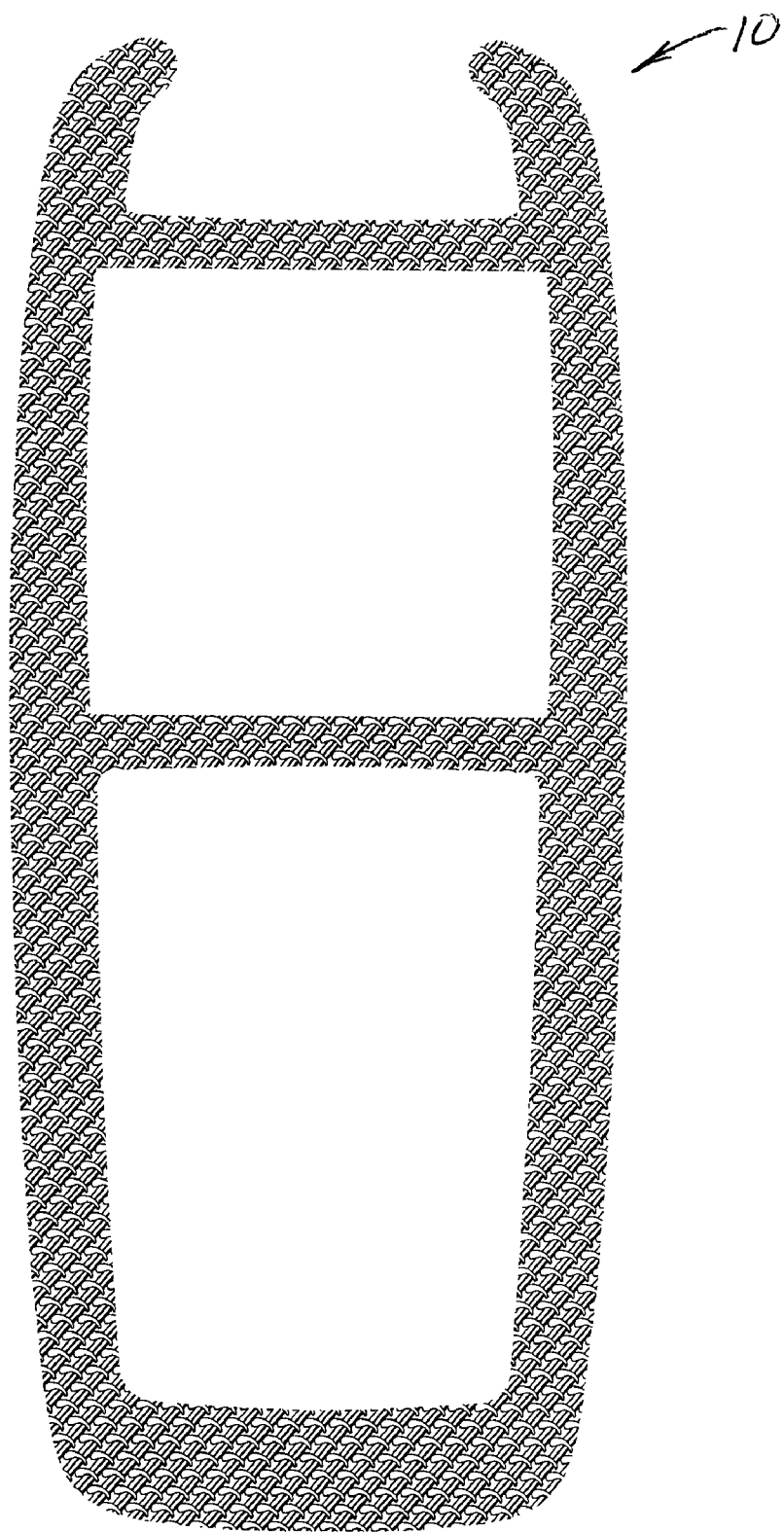
FIG. 4 is the graphic design of FIG. 3 magnified two hundred percent.
Figure 5:
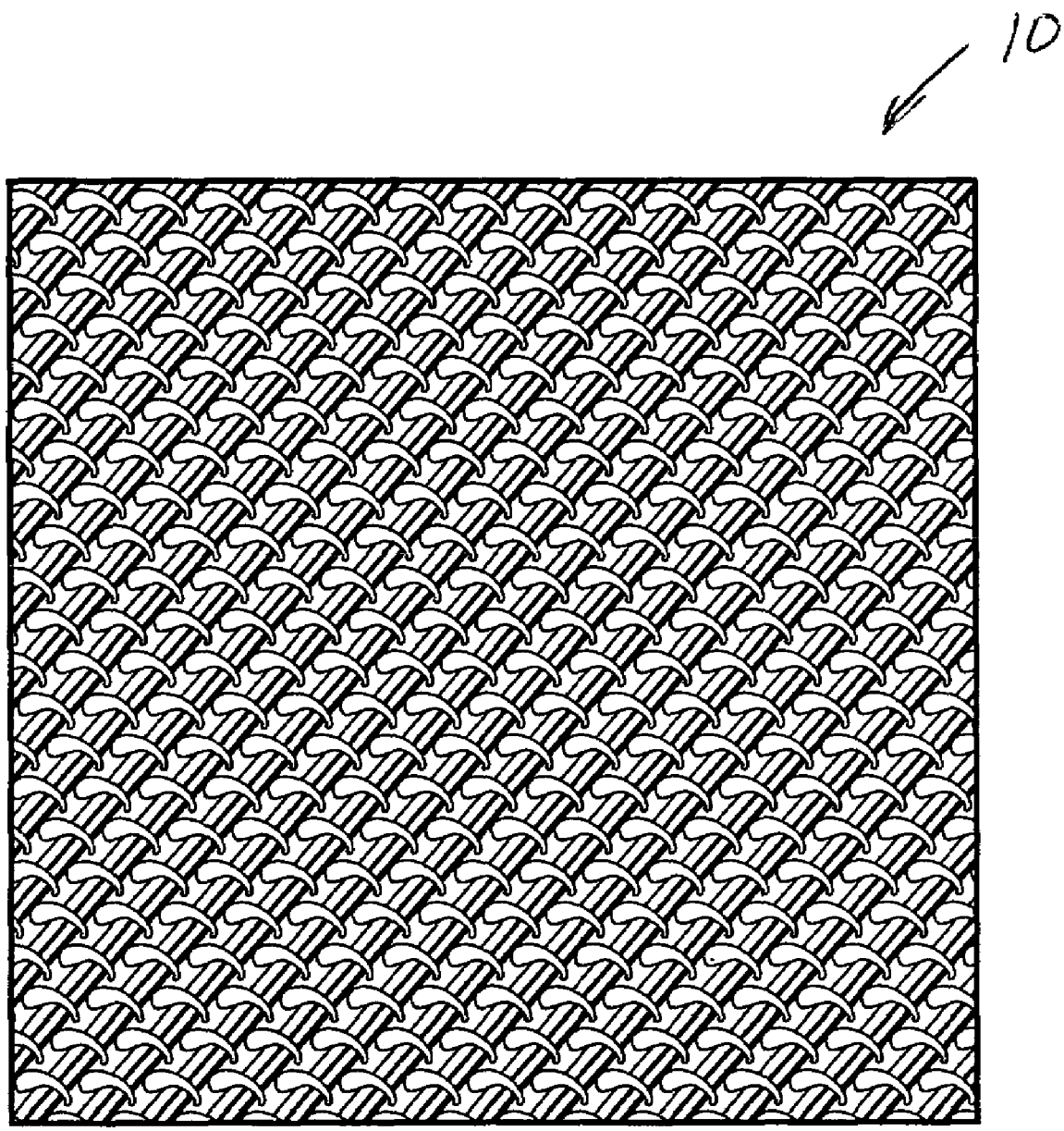
FIG. 5 is a portion of the graphic design of FIG. 3 magnified four hundred percent.
Figure 6:
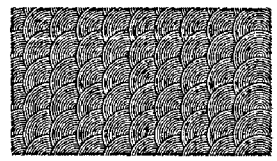
FIG. 6 is another exemplary graphic design according to the present invention.
Figure 7:
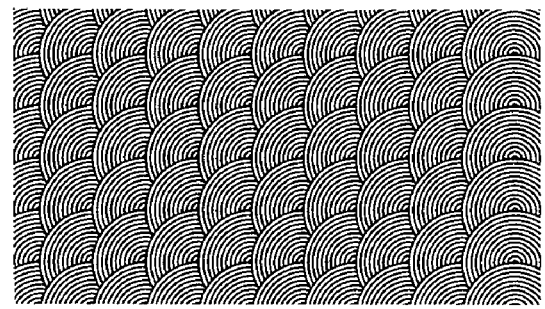
FIG. 7 is the graphic design of FIG. 6 magnified two hundred percent.
Figure 8:
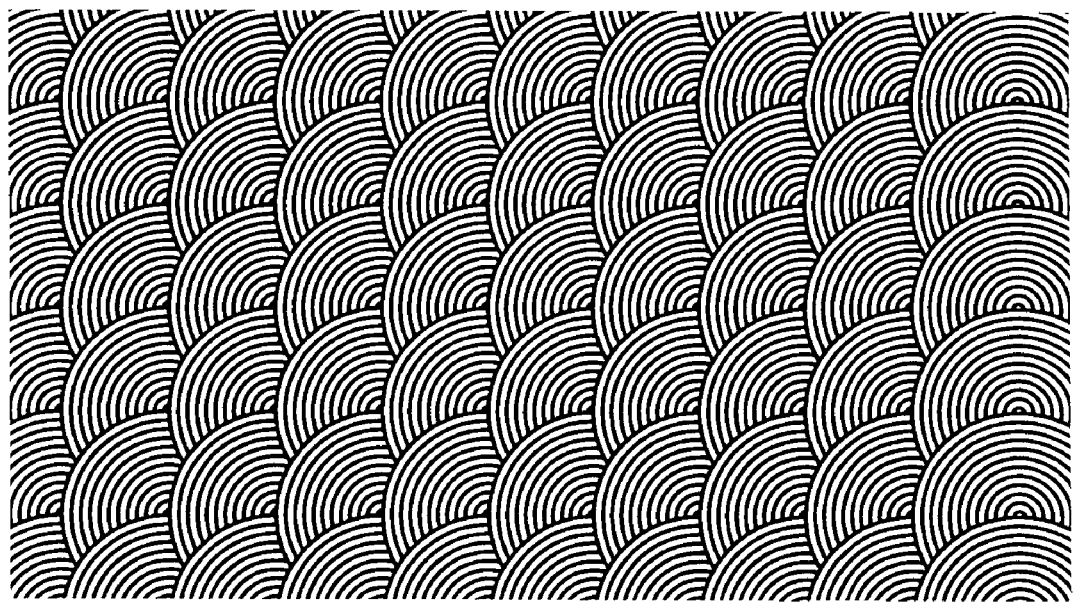
FIG. 8 is a portion of the graphic design of FIG. 6 magnified four hundred percent.
Figure 9:
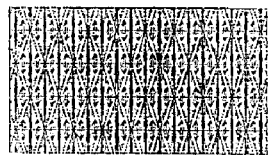
FIG. 9 is another exemplary graphic design according to the present invention.
Figure 10:
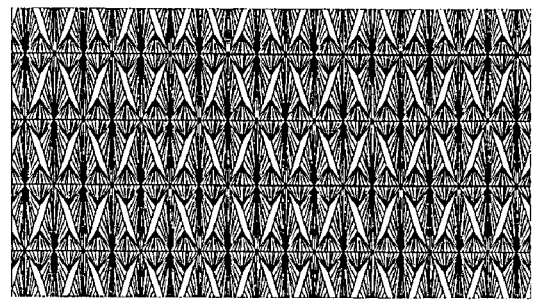
FIG. 10 is the graphic design of FIG. 9 magnified two hundred percent.
Figure 11:
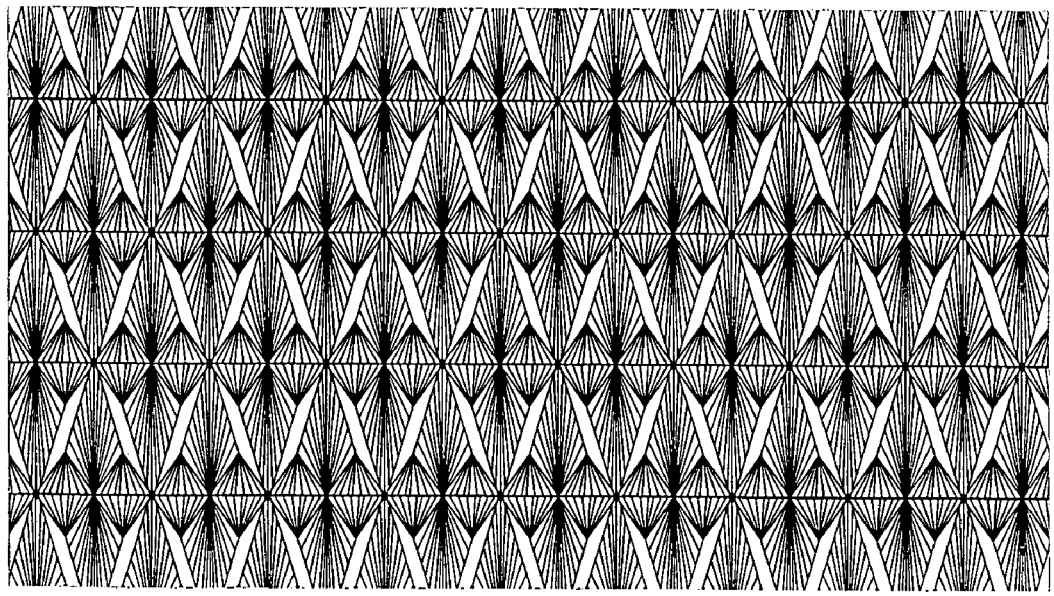
FIG. 11 is a portion of the graphic design of FIG. 9 magnified four hundred percent.
Figure 12:
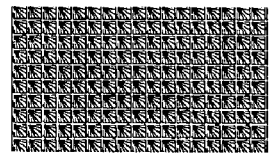
FIG. 12 is another exemplary graphic design according to the present invention.
Figure 13:
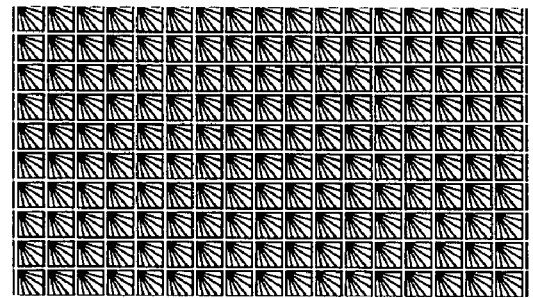
FIG. 13 is the graphic design of FIG. 12 magnified two hundred percent.
Figure 14:
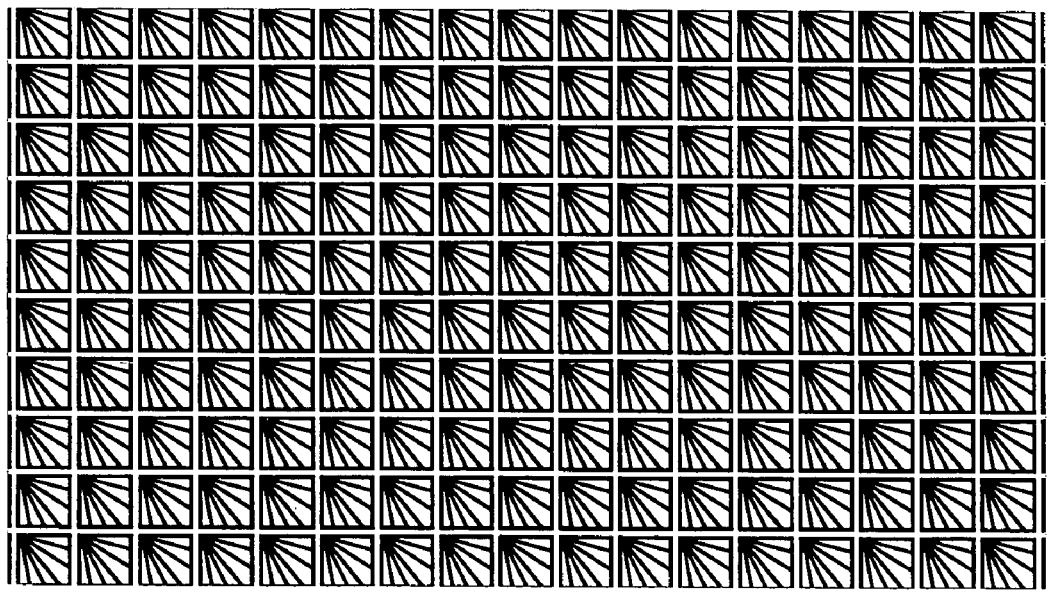
FIG. 14 is a portion of the graphic design of FIG. 12 magnified four hundred percent.

The first step in the printing method of the present invention is to create a graphic design composed of very fine lines and spaces. The lines may vary in width and have a width between about 0.002 to 0.010 inches, and more preferably between about 0.003 to 0.007 inches. The spacing between lines is between 0.002 to 0.010 inches, and more preferably between 0.003 to 0.007 inches. The graphic design may be created on a computer using design drafting software such as Corel Draw™, Autocad™, Proengineer™ or other drafting software. FIG. 3 shows an exemplary graphic design 10 configured for use in decorating the face of a cellular phone. FIG. 4 shows the same design 10 as FIG. 3 but magnified two times. In order to show the very fine lines comprising the design, FIG. 5 illustrates a small portion of the full design magnified four times from the original. As can be seen in FIG. 5, the lines have varying widths, shapes and orientation. A screen printing stencil is then made using the screen printing techniques described above. FIGS. 6-14 shows several other exemplary designs 12, 14 and 16 at various levels of magnification from full scale to 400% magnification.

Figure 15:
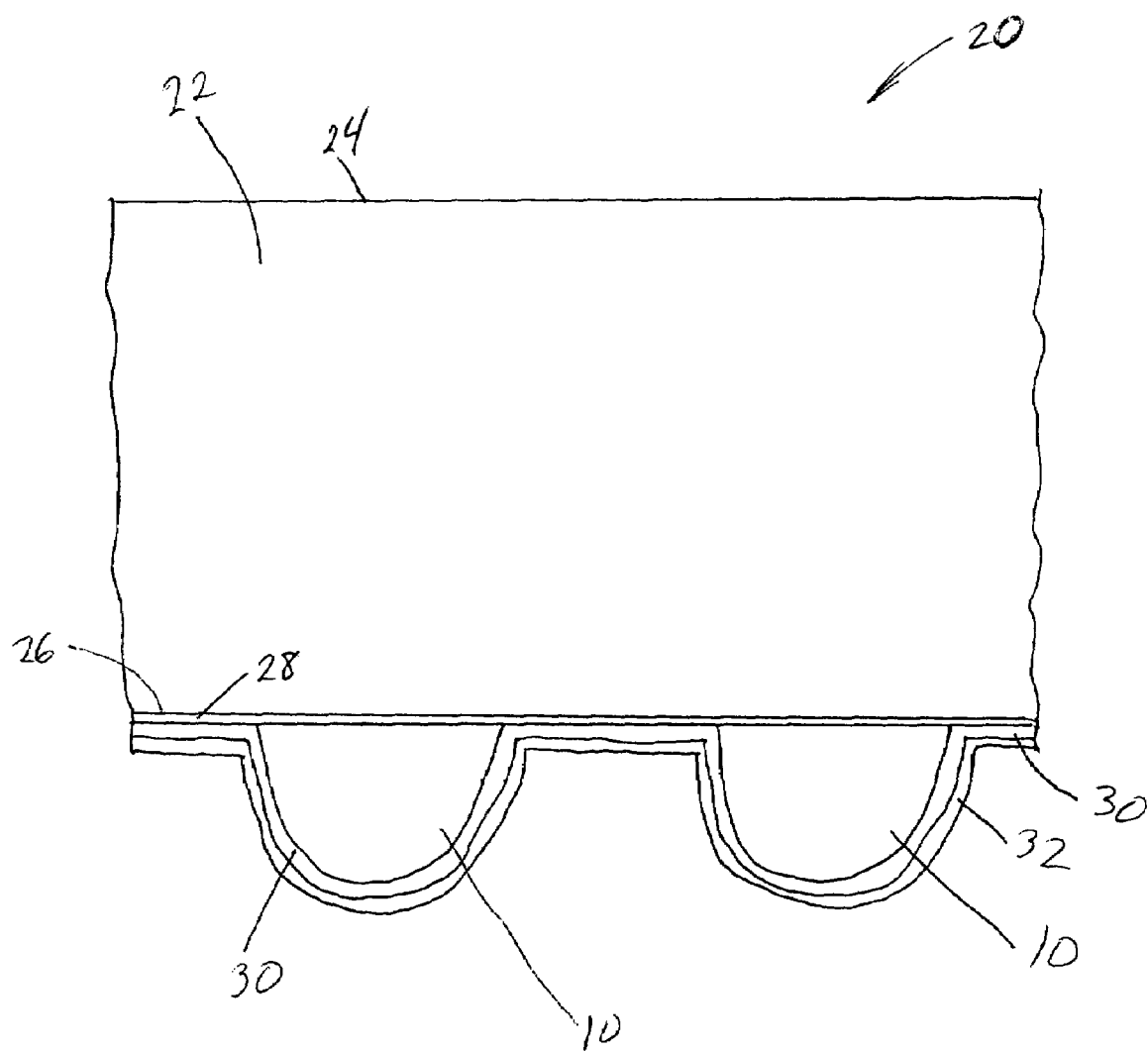
FIG. 15 is an exemplary cross-section of a printed substrate according to the present invention.

Turning to FIG. 15, a not to scale, enlarged cross-sectional view of a printed substrate 20 according to the present invention is shown. A substrate 22 has a first surface 24 and a second surface 26. The stencil is used to screen print the graphic design 10 with clear ultraviolet (UV) curable ink onto a second surface 26 of the substrate 22. Alternatively, the ink used to print the graphic design 10 may be translucent and/or tinted with color. The substrate 22 may be film made of acrylic, polycarbonate, polyester or other clear, thin plastic-like film. The film may be tinted with any desired color and may also be pre-printed with a pre-print image 28 using any suitable printing technique. The pre-print image 28 may be printed on either the first surface or the second surface of the substrate, but is shown printed on the second surface in FIG. 15. The screen printing parameters for printing the graphic design 10 are set to provide an ink layer thickness of between about 5 to 100 microns, or between about 10 to 50 microns, or between about 10 to 20 microns; depending on the desired effect. This printed substrate 20 has some textured, three-dimensional effect due to the thickness of the ink. UV curable ink is preferred because being 100% solid it will retain most of its printed thickness after curing whereas solvent based inks being 25% to 35% solid will flatten to about ⅓ of the printed wet thickness after the drying process as the solvent evaporates. However, other ink systems and printing processes can be successful in generating at least some of the desired effect. This includes but is not limited to water based inks, solvent based inks, vacuum deposition and plating processes.

A layer of reflective ink 30, such as silver or chrome ink, is screen printed over the entire second surface 26 of the substrate and the pre-print image 28, including over the clear ink 10. In order to protect the printed substrate 20 from abrasion, another protective layer 32 of pigmented ink may be screen printed over the reflective ink layer 30.

The final printed substrate 20 has a textured, three-dimensional appearance similar to a holographic image. In addition, depending on the design of the printed image, the image may create an illusion of movement similar to a holographic effect when the viewing angle is changed or the angle of incidence of viewing light is changed. The three-dimensional appearance and appearance of movement is created by changes in the refraction and diffraction of light through the fine lines printed in clear ink, enhanced by the reflection provided by the reflective layer.

The decorated substrate may then be applied to the article to be decorated and/or labeled. For example, the substrate may be bonded to the article using adhesive, ultrasonic welding, or other bonding process. The printing method of the present invention may be used to decorate and label numerous articles, including without limitation, watch dials, cellular phones, cosmetic cases, jewelry, credit cards, membership cards, collectable cards, trading cards, phone cards, and any other article which is molded or has a surface to which a substrate may be attached. Furthermore, the decorated substrate may be utilized in an in-mold decorating process as described above to decorate and label these same types of articles.

The decorated substrate and method of the present invention may be especially useful for making credit cards (which are typically thermal laminated), including those with smart chips. The decorated substrate can include both the graphic design 10 and informational text such as a name, expiration dates, account number, etc. The decorated substrate and/or a smart chip can be laminated right into the credit card by inserting the decorated substrate and smart chip between the plastic layers of the credit card. A magnetic strip may also be applied to the card so that the card information can be read electronically. Similarly, the decorated substrate can be used in the manufacture of membership cards, identification cards, phone cards, gift cards and the like. The decorated substrate may be incorporated into an in-mold label as described above to produce a credit card or other informational card.

While the present invention has been fully described above with particularity and detail in connection with what is presently deemed to be the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. A method of printing, comprising the following steps:
   providing a substrate having a first surface and a second surface;
   printing on one of said first surface or said second surface a pattern of lines in substantially clear ink, said lines having a width of between about 0.002 inches to 0.010 inches, and said lines having a finished thickness of between about 5 microns to 100 microns; and
   providing a reflective layer on said first surface or said second surface over the area of said substrate where said pattern of lines is printed.

2. The method of claim 1 wherein said printing said pattern of lines is done by the process of screen printing.

3. The method of claim 1 wherein said substantially clear ink is one of ultraviolet curable ink or electron beam curable ink.

4. The method of claim 1 wherein said reflective layer is one of silver ink or chrome ink.

5. The method of claim 1 further comprising the step of applying a layer of protective ink over said reflective ink.

6. The method claim 1 wherein said substrate is at least partially transparent.

7. The method of claim 1 wherein said reflective layer is a layer of reflective ink provided by applying the reflective ink by the process of screen printing.

8. The method of claim 7 wherein said layer of reflective ink is provided over substantially the entire area of said pattern of lines.

9. The method of claim 1 wherein said layer of reflective ink is provided over substantially the entire second surface of said substrate.

10. The method of claim 1 wherein said reflective layer is a layer of reflective ink.

11. The method of claim 1 wherein said reflective layer is provided by using a substrate having a reflective layer.

12. The method of claim 11 wherein said reflective layer is provided on said first surface of said substrate and said pattern of lines is printed onto said reflective layer.

13. The method of claim 11 wherein said reflective layer is provided by using a substrate which is made of a reflective material.

14. The method of claim 11 wherein said reflective layer is provided on said substrate by applying said reflective layer to said substrate prior to said step of providing said substrate.

15. The method of claim 1 wherein said reflective layer is provided by a process of metal deposition plating.

16. The method of claim 1 wherein said pattern of lines have a line spacing of less than about 0.010 inches.

17. The method of claim 1 wherein said pattern of lines has a line spacing of between about 0.003 to 0.007 inches.

18. The method of claim 1 where said pattern of lines is printed on said second surface and said reflective layer is provided by applying said reflective surface over said pattern of lines.

19. A method of printing, comprising the following steps:
    providing a substrate having a first surface and a second surface;
    printing on said second surface a pattern of lines in substantially clear ink, said lines having a width of between about 0.002 inches to 0.010 inches, and said lines having a finished thickness of between about 5 microns to 100 microns; and
    applying a reflective layer over the pattern of lines on said second surface.

20. The method of claim 19 wherein said printing of said pattern of lines is done by the process of screen printing.

21. The method of claim 19 wherein said substantially clear ink is one of ultraviolet curable ink or electron beam curable ink.

22. The method of claim 19 wherein said reflective ink is one of silver ink or chrome ink.

23. The method of claim 19 further comprising the step of applying a layer of protective ink over said reflective ink.

24. The method claim 19 wherein said substrate is at least partially transparent.

25. The method of claim 19 wherein said layer of reflective ink is applied by the process of screen printing.

26. The method of claim 23 wherein said layer of reflective ink is applied over substantially the entire area of said pattern of lines.

27. The method of claim 19 wherein said layer of reflective ink is applied over substantially the entire second surface of said substrate.

28. The method of claim 19 wherein said pattern of lines has a line spacing of less than about 0.010 inches.

29. The method of claim 19 wherein said pattern of lines has a line spacing of between about 0.003 to 0.007 inches.

30. The method of claim 19 further comprising the step of printing a preprint image onto said substrate prior to printing said pattern of lines.

31. A printed article, comprising:
    a substrate having a first surface and a second surface;
    a pattern of lines printed on said second surface in substantially clear ink, said lines having a width of between about 0.002 inches to 0.010 inches, and said lines having a finished thickness of between about 5 microns to 100 microns; and
    a reflective layer over said pattern of lines, said reflective layer disposed over one of said first surface or said second surface.

32. The printed article of claim 31 wherein said reflective layer is applied directly onto said pattern of lines on said second surface.

33. The printed article of claim 31 further comprising a protective layer applied over said reflective layer.

34. The printed article of claim 31 wherein said substantially clear ink is one of ultraviolet curable ink or electron beam curable ink.

35. The printed article of claim 31 wherein said reflective ink is one of silver ink or chrome ink.

36. The printed article of claim 31 wherein said substrate is at least partially transparent.

37. The printed article of claim 31 wherein said layer of reflective ink is applied over substantially the entire area of said pattern of lines.

38. The printed article of claim 31 wherein said layer of reflective ink is applied over substantially the entire second surface of said substrate.

39. The printed article of claim 31 wherein said pattern of lines has a line spacing of less than about 0.010 inches.

40. The printed article of claim 31 wherein said pattern of lines has a line spacing of between about 0.003 to 0.007 inches.

41. The printed article of claim 31 wherein said substantially clear ink is tinted with color.

42. The printed article of claim 31 further comprising a preprint image printed onto said substrate.

43. A printed article, comprising:
   a substrate having a first surface and a second surface, said first surface being reflective;
   a pattern of lines printed on said first surface in substantially clear ink, said lines having a width of between about 0.002 inches to 0.010 inches, and said lines having a finished thickness of between about 5 microns to 100 microns.

44. The printed article of claim 43 further comprising a protective layer applied over said reflective layer.

45. The printed article of claim 43 wherein said substantially clear ink is one of ultraviolet curable ink or electron beam curable ink.

46. The printed article of claim 43 wherein said reflective ink is one of silver ink or chrome ink.

47. The printed article of claim 43 wherein said substrate is at least partially transparent.

48. The printed article of claim 43 wherein said layer of reflective ink is applied over substantially the entire second surface of said substrate.

49. The printed article of claim 43 wherein said pattern of lines has a line spacing of less than about 0.010 inches.

50. The printed article of claim 43 wherein said pattern of lines has a line spacing of between about 0.003 to 0.007 inches.

51. The printed article of claim 43 wherein said substantially clear ink is tinted with color.

52. The printed article of claim 43 further comprising a preprint image printed onto said substrate.

* * * * *